United States Patent [19]

Hellman et al.

[11] Patent Number: 4,595,504

[45] Date of Patent: Jun. 17, 1986

[54] LAMELLA SEDIMENTATION DEVICE

[75] Inventors: Goran Hellman, Miami Lakes; Brian E. Garrison, Miami, both of Fla.

[73] Assignee: SFS Swede Filter System, Inc., Miami Lakes, Fla.

[21] Appl. No.: 582,323

[22] Filed: Feb. 22, 1984

Related U.S. Application Data

[63] Continuation of Ser. No. 375,650, May 6, 1982, abandoned.

[51] Int. Cl.$^4$ .......................................... B01D 17/028
[52] U.S. Cl. ...................................... 210/519; 210/521; 55/185; 55/192
[58] Field of Search ............... 210/519, 521, 522, 536, 210/534; 55/185, 186, 187, 192

[56] References Cited

U.S. PATENT DOCUMENTS

| | | | |
|---|---|---|---|
| 1,240,081 | 9/1917 | Moss | 210/536 |
| 3,687,298 | 8/1972 | Rozkydalek | 210/522 |
| 3,837,501 | 9/1974 | Pielkenrood | 210/522 |
| 3,886,064 | 5/1975 | Kosonen | 210/519 |
| 3,928,209 | 12/1975 | Engdahl et al. | 210/519 |
| 4,089,782 | 5/1978 | Huebner | 210/519 |
| 4,120,796 | 10/1978 | Huebner | 210/522 |
| 4,133,771 | 1/1979 | Pielkenrood | 210/521 |
| 4,136,012 | 1/1979 | Louboutin et al. | 210/521 |
| 4,151,084 | 4/1979 | Probstein | 210/522 |
| 4,156,644 | 5/1979 | Richard | 210/519 |
| 4,184,857 | 1/1980 | Iijima et al. | 55/186 |
| 4,194,976 | 3/1980 | Robinsky | 210/519 |
| 4,388,190 | 6/1983 | Haddock | 210/522 |
| 4,477,344 | 10/1984 | Olszewski et al. | 210/522 |

Primary Examiner—Richard V. Fisher
Assistant Examiner—Wanda L. Millard
Attorney, Agent, or Firm—Ladas & Parry

[57] ABSTRACT

Improved results can be obtained in lamella separators having a liquid feed at the base of the lamella which introduces liquid in horizontal direction perpendicular to the direction of lamellar flow by provision of a throat restriction at the point of influx and, where the feed prior to reaching the point of influx flows downwardly in an inverted V-shaped influent chamber, providing said chamber with a baffle extending across one wall of said chamber.

9 Claims, 3 Drawing Figures

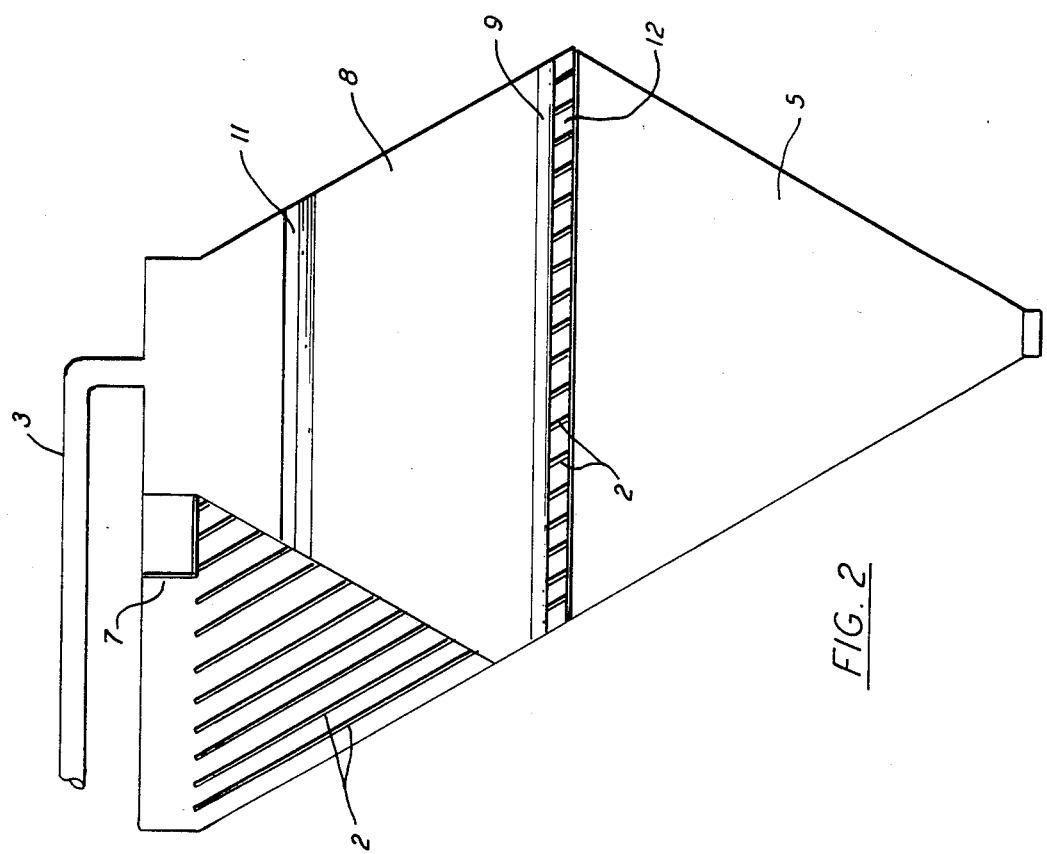

LAMELLA SEDIMENTATION DEVICE

This is a continuation of application Ser. No. 375,650 filed May 6, 1982, now abandoned.

BACKGROUND OF THE INVENTION

1. Field of the Invention

This invention is related to a device for lamella sedimentation.

2. Description of the Prior Art

Lamella sedimentation is a well-known treatment method for separating solid or liquid sedimentable constituents from a liquid and is used especially for treating water, such as drinking water and sewage. The invention is especially related to the treatment of flocculated water, such as drinking water or sewage comprising sedimentable flocks and is with advantage generally useful for treating liquids comprising sedimentable flocking materials.

Huebner's U.S. Pat. No. 4,089,782 issued on May 16, 1978 describes a prior art lamella clarifier in which liquid to be clarified is fed into a separator towards the bottom of inclined lamellas intermediate a main lamella and an auxiliary lamella. Clarified liquid is collected at the top and sludge in a trough at the bottom.

Other similar constructions are described in Huebner's U.S. Pat. No. 4,120,796 issued on Oct. 17, 1978 and in Engdahl et al's U.S. Pat. No. 3,928,209 issued on Dec. 23, 1975.

Another separator of this type is described, for example, on page 45 of the *Handbook of Advanced Wastewater Treatment* by Culp, Wesner and Culp published in 1978 by Van Nostrand Reinhold of New York.

OBJECTS OF THE PRESENT INVENTION

Such prior lamella separators have suffered the disadvantages of having the inlet feed generate currents in the sediment chamber thereby impeding separation and also have been limited in the width of lamella possible. There have, furthermore, been problems in insuring an even rate of distribution of feed to the lamellas. It is the object of the present invention to overcome these disadvantages.

BRIEF SUMMARY OF THE INVENTION

According to the present invention there is provided from a first aspect a lamella sedimentation device which comprises a package of sedimentation lamellas arranged in parallel close to each other and sloping in relation to the horizontal plane, said device being provided with inlet means at the lower end thereof extending along a part of the height extension of the lamella package for introducing a liquid between the lamellas in a flow direction which is essentially parallel to the plane of the lamellas and essentially horizontal, said inlet means being provided with a throat restriction adjacent the feed to the inlet so disposed as to produce a venturi effect at said inlet thereby accelerating the liquid inflow in a direction parallel to the plane of said lamellas and substantially perpendicular to the direction of lamellar flow along said lamellas.

The inlet flow preferably deviates no more than 30°, desirably no more than 20° from the horizontal.

From a second aspect, the invention provides a lamella sedimentation device which comprises a package of sedimentation lamellas arranged in parallel close to each other and sloping in relation to the horizontal plane said device being provided with inlet means at the lower end of and extending along part of the height of the lamella package for introducing liquid between the lamellas in a flow direction which is essentially parallel to the plane of the lamellas and substantially perpendicular to the direction of lamellar flow, the inlet being fed from an influent feed chamber substantially of an inverted V-shaped configuration, said influent chamber being provided with an intermediate baffle extending across the width thereof.

BRIEF DESCRIPTION OF THE DRAWINGS

FIG. 2 is a view along the line II—II of FIG. 1.

FIG. 3 is a view along the line III—III of FIG. 1.

DETAILED DESCRIPTION OF PARTICULAR EMBODIMENTS OF THE INVENTION

Figure 1:
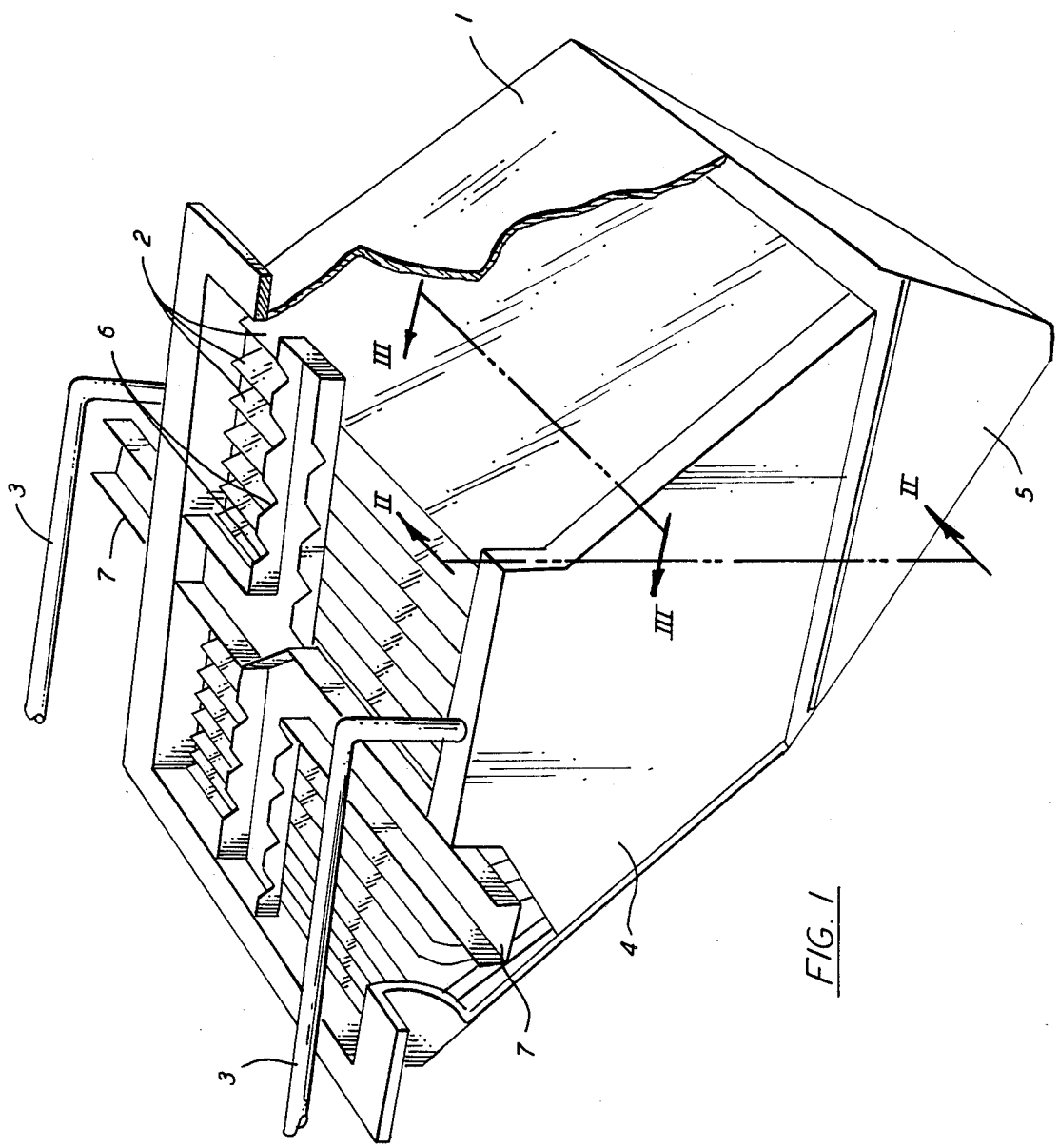
FIG. 1 is an exploded view of lamella sedimentation device acording to the invention.

FIG. 1 is an exploded view of a sedimentation device according to the present invention. It is provided with a casing 1 within which are mounted a plurality of lamellas 2. Liquid feed is fed into the separator through pipes 3 leading into influent chambers 4. The feed passes through apertures at the bottom of such influent chambers 4 into the space between the lamellas 3 and sediment drops down into the sediment chamber 5 from which it can be recovered. Clarified liquid moves upward between the lamellas 2 and spills over the weirs 6 for collection via the outlet passages 7.

FIG. 2 is a view along the line II—II of FIG. 1. In particular, it reveals the arrangement inside the influent chamber 4. The inner wall 8 of the chamber does not extend to the bottom of the lamellas and thereby provides apertures 12 through which the liquid to be clarified passes in order to enter the spaces between the lamellas. Immediately above the apertures is disposed a throat restriction comprising two elements, the restrictor 9 on the inner wall 8 of the chamber of a deflector plate 10 on the outer wall.

Also disposed on said inner wall is a baffle 11.

FIG. 3 is a view at right angles to that in FIG. 2 also showing the interior of the influent chamber.

The effect of the baffle 11 is to tend to equalize the hydraulic load across all of the lamellas thereby improving the efficiency of the sedimentation. The baffle can be placed at any convenient point on wall 8 and is typically between one and two-thirds of the way down the wall. It can be of any convenient shape and indeed may desirably be of varying cross section so as to improve the flow of liquid to the outermost lamellas. One convenient form presents a surface at an angle of 45° to the liquid flow. The baffle need not be linear and could conveniently be in the form of an arc.

The restrictor 9 may be in any convenient form for example having the half pear shaped cross section shown in FIG. 3. The deflection plate 10 is of any convenient shape to ensure that liquid descending the chamber 8 is directed to flow through the apertures 12. Most conveniently such a deflector plate is arcuate typically subtending a 90° angle to its center of curvature. The combination of the restrictor 9 and the plate 10 causes a venturi effect which accelerates the influent in a direction parallel to the plane of said lamellas and perpendicular to the direction of lamellar flow along said lamellas at the point where it is passing into the space between the lamellas which has the result that previous problems of fresh influent passing direct into the sedimentation chamber 5 or creating currents there are avoided. It also permits a widening of the lamellas, and thus an apparatus capable greater through put without loss of efficiency.

It is often convenient to have disposed between the main lamellas smaller auxiliary lamellas. Such auxiliary lamellas assist in avoiding interference of the upward lamella flow with the down-going sludge stream, assisting in distribution of the feed and, by virtue of the slight turbulence created at the top thereof promote the down flow of sludge particles.

Such auxiliary lamellas may extend only to a height of 0.1 to 0.6 preferably 0.2 to 0.4 the height of the main lamellas. Suitably, one such auxiliary lamella can be disposed between each pair of main lamellas. Typically, such auxiliary lamellas are raked at the same angle as the main lamellas. However, if desired they may have variable slope and need not be disposed at the same angle to the horizontal as the main lamellas. For example, in such a case the lower portion of an auxiliary lamella is disposed at an angle to the horizontal up to 10° less than that of the main lamellas but the upper portion is parallel to the main lamellas. Furthermore, the angles to the horizontal at the edges of the auxiliary lamellas particularly in the lower portions thereof may be greater than at the center. These may be disposed at the same angle to the horizontal as the main lamellas but often deviate from said angle, e.g. deviate up to about 10° from preferably the angle of the auxiliary lamella.

The longitudinal extension in the direction of slope of the lamellas may vary in a high degree depending upon the treatment conditions as is well-known to an expert. A common value of the longitudinal extension is about 1 m.

The longitudinal extension ($l_1$) of the auxiliary lamellas preferably stands in a certain relation to that of the main lamellas (l). Usually $l_1 = 0.1-0.6$ of l and preferably 0.2-0.4 of l. The auxiliary lamellas preferably extend from the level of the lower edge of the main lamellas to a level which corresponds to the stated longitudinal extension $l_1$ above the lower edge of the main lamellas.

The inlet for the treated water are preferably arranged at the lower end of the lamella package between the auxiliary lamellas when these are and the adjacent "overlying" main lamella. Hereby the inflowing water is brought to move upwardly between the auxiliary lamella on the upper side of the auxiliary lamella and the upper side of the adjacent main lamella is counteracted. This contributes to enhancing the sedimentation and the sinking down of deposited material on the upper sides of the lamellas.

The auxiliary lamellas can be arranged in the middle between the main lamellas but can also be arranged closer to the overlying main lamella or closer to the underlying lamella anywhere from 25 to 75% of the distance between the main lamellas.

The height extension of the inlet openings preferably amounts to at least 0.05 especially at least 0.1 times the height extention l of the main lamellas.

What is claimed is:

1. A lamella sedimentation device which comprises a package of sedimentation lamellas arranged parallely close to each other and sloping in relation to the horizontal plane said device being provided with an influent feed chamber wherein liquid flows in a substantially vertical direction, said influent feed chamber having an inner wall adjacent said package of sedimentation lamellas and an outer wall spaced therefrom said device being further provided with inlet means at the lower end thereof and extending along part of the height extension of the lamellas package for introducing a liquid between the lamellas in a flow direction which is essentially parallel to the plane of the lamellas and essentially horizontal, said inlet means being fed by said influent chamber and, there being provided a throat restriction in said influent chamber upstream of said point of introduction between the lamellas said restriction being in the form of a restrictor mounted on at least one of said walls of said influent feed chamber and a deflector plate mounted on the outer wall of said influent chamber said deflector being positioned at the point of introduction of the liquid into the package of sedimentation lamellas and being progressively inclined in the down stream direction so as to change the direction of liquid flow from substantially vertical to substantially horizontal so as to produce a venturi effect at said point of introduction thereby accelerating the liquid flow in a direction parallel to the plane of said lamellas and substantially perpendicular to the direction of lamella flow along said lamellas.

2. A device according to claim 1 which is further provided with auxiliary lamellas intermediate said lamellas, said auxiliary lamellas being shorter than the principal lamellas.

3. A device according to claim 2 wherein the point of introduction of liquid between lamellas is disposed between an auxiliary lamella and its overlying principal lamella.

4. A lamella sedimentation device as claimed in claim 1 wherein said inlet is fed from an influent feed chamber substantially of an inverted V-shape configuration, said influent chamber being provided with a baffle extending across the width thereof.

5. A device according to claim 4 wherein said throat restriction is provided by a restrictor of a substantially half pear shaped cross section configuration on one wall of said influent chamber and a deflector plate mounted on the opposite wall thereof.

6. A lamella sedimentation device according to claim 4, wherein said baffle is positioned at approximately the mid point of the axis of the inverted V defining the influent chamber.

7. A lamella sedimentation device according to claim 4, wherein said baffle presents a surface at a 45° angle to liquid flow.

8. A lamella sedimentation device according to claim 4, which is further provided with auxiliary lamellas, said auxiliary lamellas being shorter than the principal lamellas.

9. A device according to claim 1, where said restriction comprises a restriction of a substantially half pear shaped cross section configuration.

* * * * *